United States Patent [19]

Tamborini et al.

[11] 3,969,052

[45] July 13, 1976

[54] PROCESS OF THE MAKING OF EXTRUDED THERMOPLASTIC BODIES AND DEVICE FOR THE CARRYING OUT OF THE SAID PROCESS

[76] Inventors: Ariberto Tamborini; Giancarlo Tamborini, both of Via 25 Aprile, Daverio, Italy

[22] Filed: Apr. 12, 1974

[21] Appl. No.: 460,378

[30] Foreign Application Priority Data

May 29, 1973 Italy .............................. 24685/73

[52] U.S. Cl. .............................. 425/113; 264/137; 264/173; 264/174; 264/209
[51] Int. Cl.² ........................................ F16L 11/08
[58] Field of Search ........... 264/173, 174, 209, 137; 425/113, 114

[56] References Cited
UNITED STATES PATENTS

| | | | |
|---|---|---|---|
| 2,620,514 | 12/1952 | Sampson et al. | 425/113 |
| 2,730,761 | 1/1956 | Castellan | 425/113 |
| 2,730,762 | 1/1956 | Ballard | 425/113 |
| 3,779,846 | 12/1973 | Kleykamp et al. | 264/209 |

FOREIGN PATENTS OR APPLICATIONS

| | | | |
|---|---|---|---|
| 958,055 | 5/1964 | United Kingdom | 264/173 |

*Primary Examiner*—Jeffery R. Thurlow
*Attorney, Agent, or Firm*—Ralph W. Kalish

[57] ABSTRACT

A method for embedding a reinforcing element within a molded thermoplastic body and a device for accomplishing said method which comprises a single extrusion head, having a duct for feeding thermoplastic material to a sizing run. The axis of the duct is at an acute angle to the axis of the sizing run and the said sizing run communicates in its portion opening into said duct with a co-axial chamber through which a reinforcing element is fed to said sizing run. The cross-section of the sizing run is greater than that of the chamber whereby the reinforcing element will be located intermediate the opposed sides of said sizing run.

11 Claims, 4 Drawing Figures

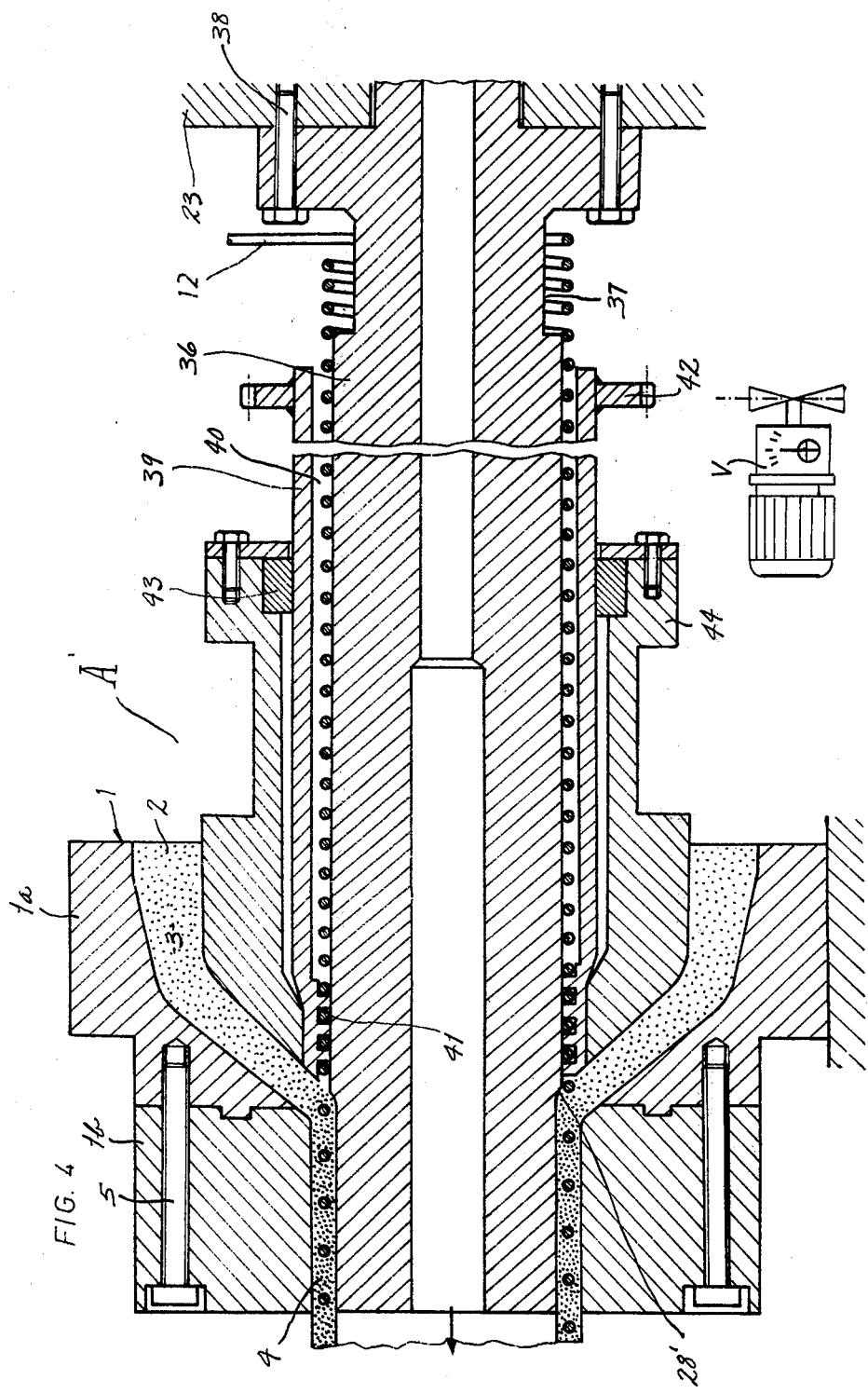

PROCESS OF THE MAKING OF EXTRUDED THERMOPLASTIC BODIES AND DEVICE FOR THE CARRYING OUT OF THE SAID PROCESS

BACKGROUND AND SUMMARY OF THE INVENTION

This invention relates in general to a new and improved process for making extruded thermoplastic members reinforced with an embedded helically formed wire, such as, particularly, with respect to pipes, and to a device for effecting such process.

Heretofore, various expedients have been developed in an attempt to reinforce thermoplastic members with metal wires or with synthetic fibers, but the same have consistently proved inadequate. One such effort involved the utilization of a pair of spaced apart extrusion heads for the thermoplastic material whereby an inner pipe section was formed by the first extrusion head and the reinforcing member, such as wire, was wound about the exterior thereof as the same was being advanced to the second extrusion head. In the latter head an outer pipe section or second thermoplastic layer was applied upon the wire wound inner section. This equipment had the obvious drawback of requiring a pair of extrusion heads with their respective feeding devices and with an independent device therebetween for applying the wire. Furthermore, pipes produced by such equipment were potentially weak in the zone of the interface between the inner and outer pipe sections as the bond therebetween was of but limited resistance to mechanical stresses. For example, with the development of a high vacuum within the pipe, the two sections would part, thus, negating the expected reinforcing effect of the wire with the pipe becoming useless.

Another machine which is in current use incorporating a single extrusion head causes the helical wire to be fed to the head in such manner as to effect jamming in the injection chamber due to the resistance of the thermoplastic material whereby the wire is compressed and the turns or coils are displaced from the longitudinal axis of the spiral. In attempts to minimize such jamming potential the thermoplastic material is injected in a rather highly liquefied state markedly remote from the optimal densities and temperatures normally preferred. Also, such equipment is devoid of a sizing run for the finished pipe and merely includes a relatively short run as in the order of 2 to 4 mm at the outlet of the extrusion head. Such constructional character was contrived to reduce the compression of the thermoplastic material which might tend to force the wire coils from the desired uniform diameter.

Such currently known devices, including the foregoing, do not produce a pipe having a wall of constant cross-section or thickness and with inner and outer surface regularity since the pipes produced have walls with an undulating or wavy character with the surfaces relatively rough and highly irregular. Pipes with such manifest defects are productive of losses of charge and entail union sealing problems requiring, as for example, locking by means of compression rings and the like. Another disadvantage is that pipes produced by existing equipment must perforce involve walls of relative thickness to counteract any axial displacement of the wire coils so as to prevent portions thereof from projecting through the outer surface of the pipe.

Therefore, it is an object of the present invention to provide a process for producing extruded thermoplastic bodies having a reinforcing means provided therein such as helically formed wire which are devoid of the deficiencies present in like members produced in accordance with existing equipment or currently practiced processes.

It is another object of the present invention is to provide a device for the purpose stated which incorporates but a single extrusion head and with means for presenting the reinforcing agents, such as, a coil wire, to the thermoplastic so as to assure of consistent centering of the same within the formed body.

It is another object of the present invention to provide a device for the purpose stated which is adapted for producing extruded pipe of thermoplastic material having sized, smooth surfaced, relatively thin walls which are of constant cross-section and wherein the embedded reinforcing member, such as a coil wire, is substantially equidistant from the inner and outer wall surfaces.

It is a further object of the present invention to provide a method for embedding the reinforcing member within a thermoplastic body which may be economically practiced and readily performed by relatively unskilled individuals and one wherein requisite positioning of the reinforcing member is consistently achieved.

It is another object of the present invention to provide a device of the character stated which is so constructed as to be resistant to malfunctioning, jamming, or the like by reason of the unique relationship of the components.

It is another object of the present invention to provide a device of the character stated which is comprised of a simplicity of parts; which is economical in operation; and which is durable and reliable in use.

BRIEF DESCRIPTION OF THE DRAWINGS

FIG. 4 is a vertical transverse sectional view of another form of extruder constructed in accordance with and embodying the present invention.

DESCRIPTION OF PRACTICAL EMBODIMENTS

Figure 1:
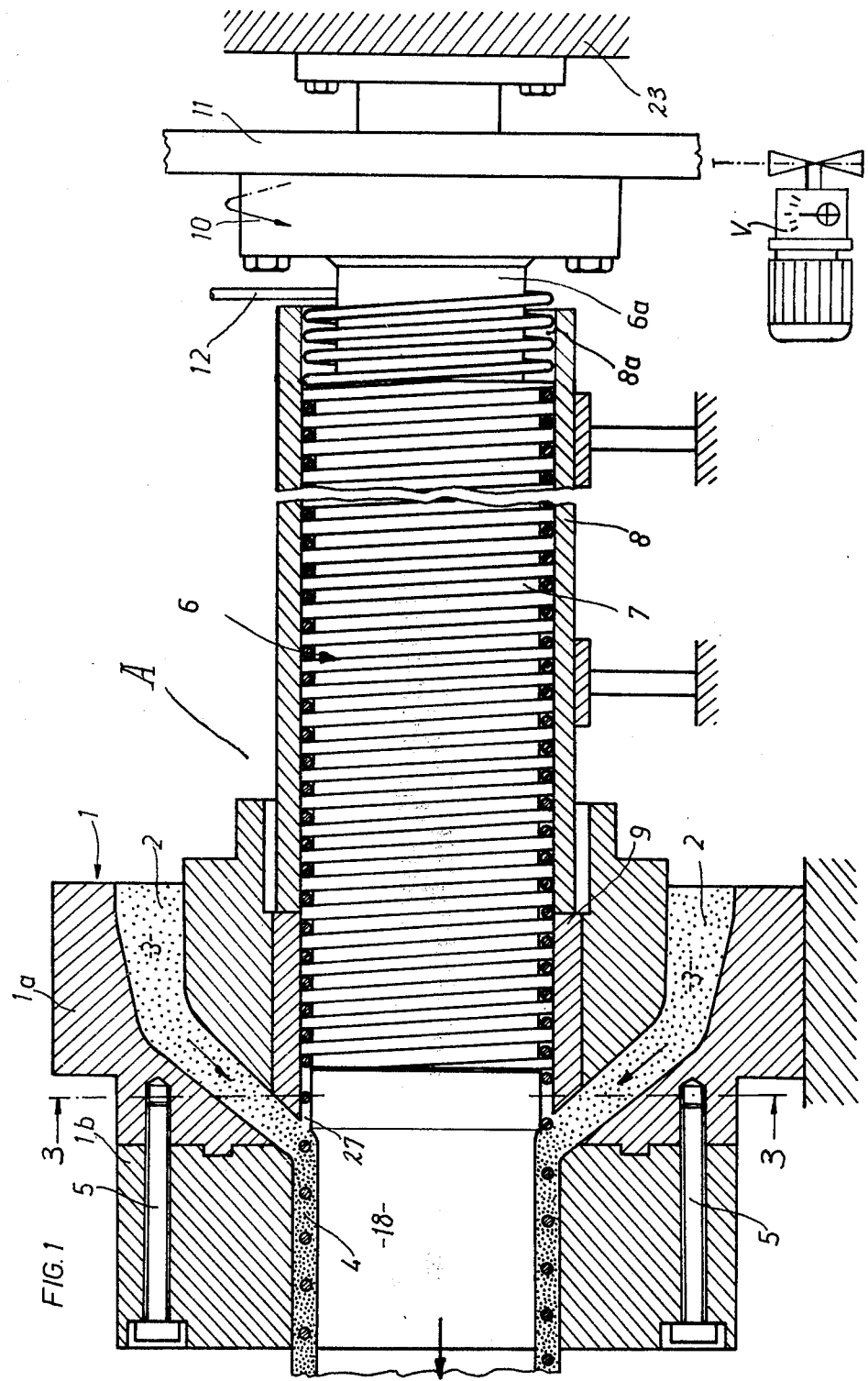
FIG. 1 is an elevational view, substantially in section, of an extruder constructed in accordance with and embodying the present invention.
Figure 2:
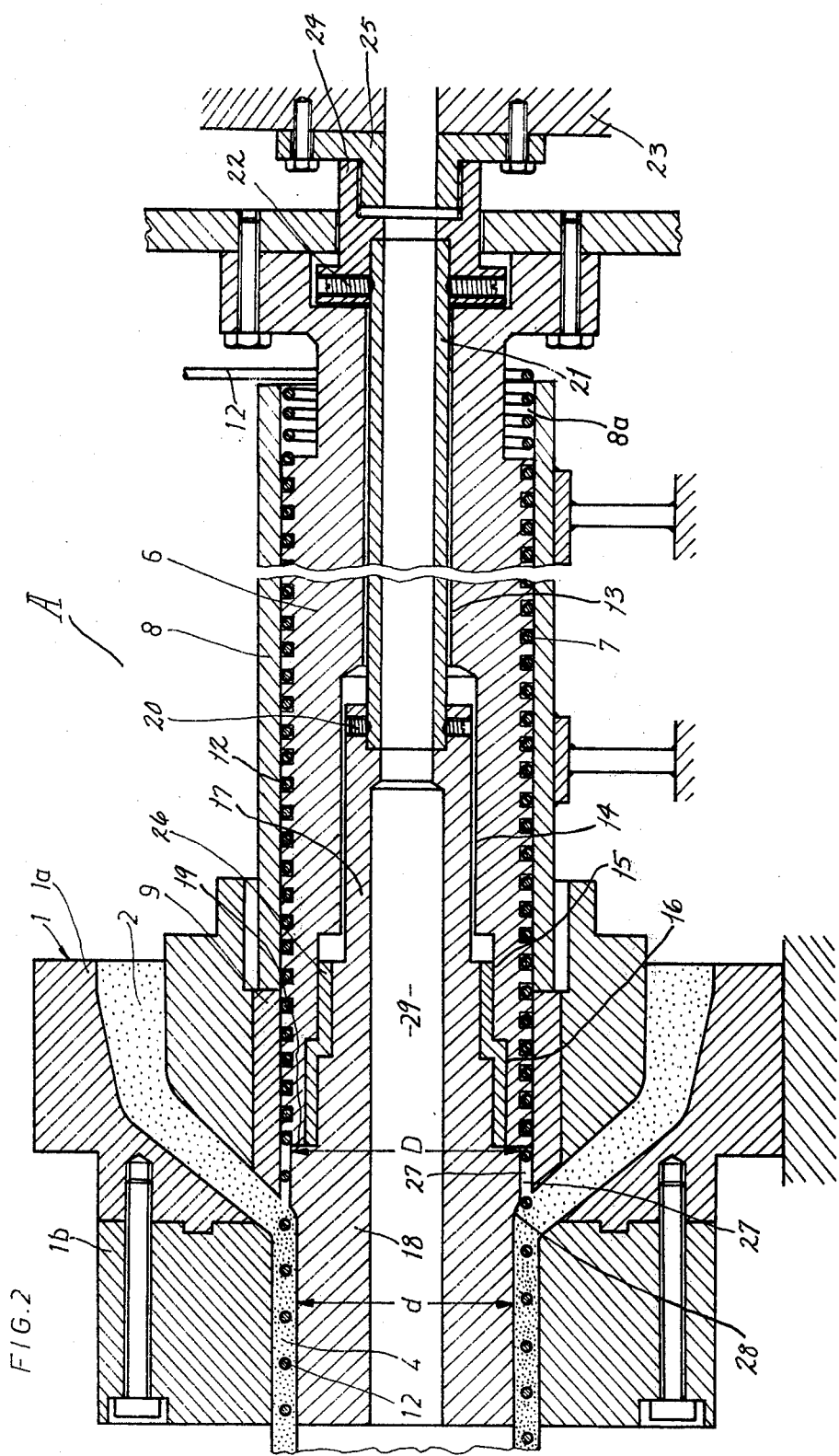
FIG. 2 is a vertical transverse sectional view of the extruder.
Figure 3:
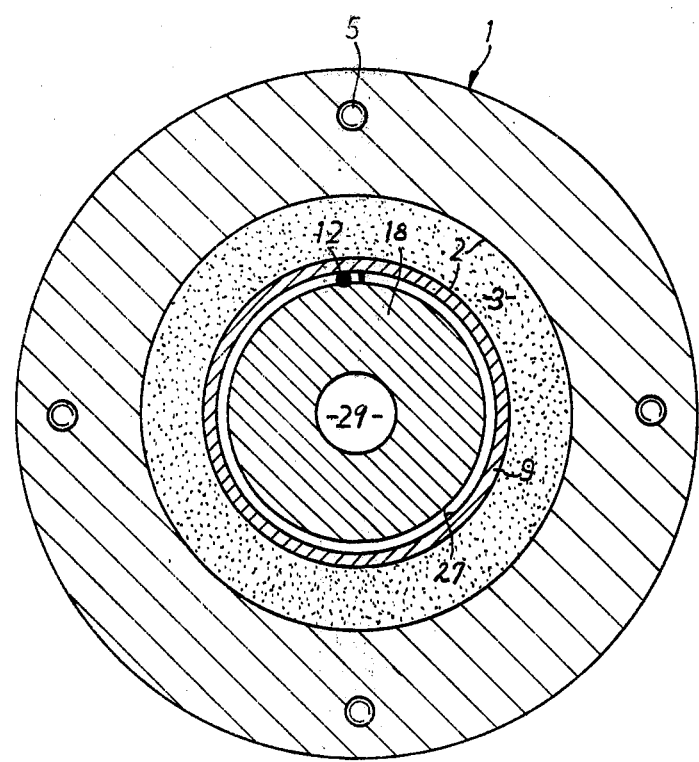
FIG. 3 is a vertical transverse sectional view taken on the line 3—3 of FIG. 1.

Referring now by reference numerals to the drawings which illustrate practical embodiments of the present invention, A broadly designates an extruder having an extrusion head 1 comprised of engageable, generally annular, axially aligned components 1a and 1b, with the same being coupled as by screws 5. Provided within component 1a is an annular feed or injection duct 2 connected to a hopper or other supply (not shown) of thermoplastic material 3 for flow through said duct 2 inwardly of head 1 for advancement along a sizing run 4, the outer boundry of which is defined by the inner face of extrusion head component 1b. Extending at its forward end, that is, toward the left hand side of FIG. 1, within head component 1a, is a shaft 6 being provided about its peripheral surface with a lead thread 7 of variable pitch whereby said shaft 6, as will be seen, serves as a conveyor. At its opposite or rearward end, shaft 6 is provided with a diametrically reduced portion 6a, and at such end, by means of a plate 10, is operatively engaged to a driven member designated 11, whereby, through rotation of the latter, rotary motion is imparted to shaft 6. Although any suitable means may be used for driving member 11 there has been found advantageous to utilize a geared motor V as the latter permits of control of the angular velocity of shaft 6 for purposes presently appearing. Driven member 11 preferably constitutes the rotating head of a conventional coil winder (not shown) as utilized in drawing wire stock, as indicated at 12, from a reel (not shown) forming same into a helix for reception upon the rearward end portion 6a of shaft 6. It is to be observed that the winding machine (not shown) forms the helix independently of the diameter of shaft portion 6a thereby obviating any forcing of the coil with respect to such shaft end 6a and with requisite clearance in view of the fact that the inner diameter of the formed wire is greater than that of the outside diameter of the shaft reduced portion 6a.

Disposed encirclingly of shaft 6 from a point substantially intermediate the length of the reduced portion 6a to a point within head component 1a, but spaced from the forward end thereof, is a fixed sleeve 8. The inside diameter of sleeve 8 is substantially of like extent as the major diameter of lead thread 7 but with permitting of uninhibited rotation of said shaft 6. In its rearward end portion, sleeve 8 cooperates with shaft reduced portion 6a to define a lead-in volume 8a for introduction of the helically formed wire 12 to facilitate feeding of the same to lead thread 7. Abutting the forward end of sleeve 8 is a cooperating relatively short slideably disposed bushing 9, the forward end face of which cooperates with feed duct 2 to provide a segment thereof. Said bushing 9 is of like inside diameter as sleeve 8 and cooperates on such surface with lead thread 7 in the same manner.

From the foregoing it is apparent that by utilization of a variable speed motor, the pitch of the wire 12 may be controlled as with increased speeds the same will be commensurately smaller and with relatively reduced speeds will be correspondingly greater.

Shaft 6 is axially boared throughout its length as by means of a bore 13 and counterbores of increasing diameter progressing forwardly, as indicated at 14, 15, 16, with there being received within counterbores 14, 15, 16, the complimentarily contoured rearward end portion 17 of a core 18 having a rearwardly directed shoulder 19 for snug abutment against the confronting forward end face portion of shaft 6. Within counterbore 14 the rearward extremity of core 18 is fixed, as by stud bolts 20, to the forward end of a stem 21 which progresses through shaft bore 13 and being secured at its rearward end, as by stud bolts 22, to the stationary body as indicated 23 of extruder A through cooperating adapters 24, 25. It will thus be seen that core 18 is locked by means of stem 21 to the body of extruder A. As the rearward progressively diametrally reduced portions of core 18 are of less diameter than the inside diameters of the surrounding counterbore portions of shaft 6, a sliding bushing or the like, 26, is provided therebetween for reducing friction to a minimum.

The outside diameter of core 18 immediately adjacent shaft 6, as indicated by D, is the same as the kern, or minor diameter, of threaded shaft 6 whereby the peripheral surface of said core 18 in such zone cooperates with the confronting portion of the inner face of bushing 9 to provide a short annular chamber 27 corresponding to the diameter of wire 12, the forward end of which opens into feed duct 2. Forwardly of such confluence, core 18 is externally slightly inwardly tapered, as at 28, for diametral reduction, as indicated by d whereby the outer face of core 18 forwardly of such taper cooperates with the opposed inner face of extrusion head component 1b to define the annular chamber constituting sizing run 4, having a cross-section greater than the diameter of wire 12. Thus, within said sizing run 4, the helically formed wire 12 will be introduced into the plastic material moving from feed duct 2 for embedding therein. It is desirable for conducting to the effective presentation of the wire coil 12 within the plastic material with obviation of jamming or other impedance that the axis of duct 2, in the zone of its communication with sizing run 4, form an acute angle with the axis of sizing run 4, and that the chamber 27 and sizing run 4 be coaxial. Accordingly, flow of plastic material from duct 2 into chamber 27 is substantially inhibited.

Sizing run 4 desirably is of considerable length as, for example, within the range of 100 to 200 mm, although it is understood that such length may be increased, if required, as for example, to size pipe of increased diameter.

Said core 18 is provided with an axial bore 29 which is continuous with the interior of stem 21 to provide a compartment for receiving a heating plug and associated conductors for connection to a convenient power source; the latter are of conventional design and do not form a part of the present invention but serves to provide the requisite temperature for maintaining the thermoplastic in a homogeneous flowable mass at optimal density in accordance with well known practice.

In view of the foregoing, the operation of extruder A should be readily apparent. As described above, the helically formed wire 12 is directed onto the threaded outer surface of shaft 6 while the latter is rotating and, thus, causes said wire to be moved in a rectilinear direction toward extrusion head 1. The wire helix is moved through chamber 27 and into sizing run 4 for reception within the thermoplastic material flowing therein from feed duct 2; said plastic material within said sizing run 4 being maintained at optimal temperature and density. Thus, the turns of the wire coil are immediately covered by the liquid-like plastic, being fully encased therein and being drawn thereby through sizing run 4. As will be evident by reference to the drawings, the wire coil will be substantially centered within the plastic material by reason of the relatively greater cross-section of sizing run 4 than the path of movement of the wire coil 12 within extruder A so that the resultant reinforcement will be of consistent and yet maximum strength throughout the produced pipe. Since the cross-section of sizing run 4 is relatively increased, the wire 12 received therein will be immediately supported by a layer of thermoplastic material flowing against the outer face of core 18 which also serves to prevent any undesired axial displacement of said wire 12.

In the contingency that the helical formed wire 12 should be jammed at the forward end of chamber 27 by reason of the resistance presented by the thermoplastic material 3, the wire will be prevented from axial displacement by reason of the guide provided by thread 7. Nevertheless, such thread 7, by reason of rotation of shaft 6, will serve to assure that the successive turns of the wire coil will be continuously fed through chamber 27 and forced into the thermoplastic material 3. If for any reason thermoplastic material 3 should accidentally enter chamber 27 rearward flow thereof will be effectively prevented as rotation of shaft 6 will force such material forwardly toward sizing run 4, in the same direction as that of the wire feed. As the finished reinforced pipe departs sizing run 4, at its discharge end (not shown), the same is gripped by transporting rollers or other like means presented along a cooling chamber which exercises a light pull on the pipe to facilitate its withdrawal from extrusion head 1.

From the foregoing it is obvious that the thread 7 on shaft 6 may be varied in pitch, such as, for example, to slightly compress the turns during the infeed. Patently, geared motor V, being the prime mover for rotating shaft 6, can be controlled so that the speed of the wire feeding operation can be controlled according to the particular requirements. Thus, for example, by increasing the speed of rotation, the wire turns in the finished pipe will be relatively close together, while decreasing such speed causes the wire turns within the finished pipe to be relatively farther apart.

Turning now to FIG. 4, another form of extruder, indicated A', is illustrated and wherein components having corresponding components in extruder A above described will bear like reference numerals. Said extruder A' is provided with a shaft 36 which is diametrally reduced adjacent its rearward end portion, as at 37, for receiving the coil wire 12 from the winding machine and which at its lower extremity is rigidly secured, as by bolts 38, to the stationary body 23. The exterior surface of shaft 36 is continuous and unthreaded. Disposed encirclingly of shaft 36 between portion 37 and its taper 28' adjacent the forward end of duct 2, is a continuous sleeve 39 which, throughout its major portion, is of greater inside diameter than the outside diameter of the confronting portion of shaft 36 to define therewith an elongated annular chamber 40 through which the wire coils are advanced. In its forward end portion sleeve 39 is internally threaded, as at 41, for cooperating with the adjacent surface of shaft 36 for guiding the wire turns into the forward end of feed duct 2 for embedding within the thermoplastic material. Said sleeve at its rearward end incorporates a radially projecting sprocket 42 for training thereabout of a transmission belt or chain (not shown) operatively connected to geared motor V. Sleeve 39 is suitably supported for rotation by a bushing 43, or the like, as maintained in position through a recessed boss 44.

Extruder A' is especially suitable when the wire stock is relatively thick and, thus, assures of the generation of minimum friction by the feeding operation, since there is only a limited zone of threading. The said extruder A' operates in a similar manner as extruder A above described, but differs therefrom in that the shaft 36 is fixed with sleeve 39 being rotated thereabout as distinguished from extruder A wherein the sleeve 8 is stationary and the shaft 6 is caused to rotate.

Having described our invention, what we claim and desire to obtain by Letters Patent is:

1. A device for embedding an elongated helically shaped reinforcing element within a molded thermoplastic body of annular cross section comprising an extrusion head having a forward portion and a rearward portion, a source of thermoplastic material, said extrusion head rearward portion having a feed duct with an inlet communicating with said source of thermoplastic material, said duct extending through said extrusion head and opening through the forward portion of the inner face thereof providing a feed duct outlet, said extrusion head forward portion embodying a longitudinally extending, annular sizing run having a rearward end communicating with said feed duct outlet, means provided internally of said extrusion head rearward portion, rearwardly of said sizing run and said feed duct outlet, defining an annular passage coaxial with said sizing run, but having a cross section less than that of said sizing run, said annular passage having a forward outlet end communicating with the rearward end of said sizing run substantially at the confluence of the latter with said feed duct outlet, means provided rearwardly of said annular passage and communicating with same at its rearward outlet carrying a supply of said reinforcing element, and means for advancing said supply carrying means whereby said reinforcing element is introduced into said passage, forced therethrough, and thence forced into said sizing run whereby in view of the coaxiality of said annular passage and said sizing run said reinforcing element is centered within said sizing run.

2. A device for embedding an elongated helically shaped reinforcing element as defined in claim 1 and further characterized by said means for advancing said element comprising a shaft concentric with said passage and extending rearwardly therefrom, a sleeve fixedly mounted within the rearward portion of said extrusion head and in encircling relationship to said shaft, said shaft being provided with a continuous peripheral thread receiving said reinforcing element, said sleeve having an inside diameter of substantially like extent as the major diameter of the shaft thread for permitting of uninhibited rotation of said shaft, means for effecting rotation of said shaft within said sleeve, the threads of said shaft terminating spacedly from its passage adjacent end.

3. A device for embedding a reinforcing element as defined in claim 1 and further characterized by said passage being in registering centered relationship with respect to said sizing run whereby a reinforcing element introduced into said sizing run from said chamber is substantially equidistant from the opposite sides of said run.

4. A device for embedding a reinforcing element as defined in claim 1 and further characterized by means for controlling the speed of said advancing means.

5. A device for embedding an elongated helically shaped reinforcing element as defined in claim 1 and further characterized by said advancing means comprising a shaft fixed within the rearward portion of said extrusion head and extending longitudinally thereof in coaxial relationship with said sizing run but terminating spacedly of said passage, there being means defining a sleeve surrounding said shaft, means for effecting rotation of said sleeve, said shaft having a peripheral thread cooperating with the confronting portion of said rotatable sleeve to define a guide for said reinforcing element.

6. A device for embedding a reinforcing element as defined in claim 2 and further characterized by said reinforcing element being a helically formed wire having an inside diameter greater than the outside diameter of the shaft and less than the inside diameter of said sleeve means.

7. A device for embedding a reinforcing element as defined in claim 6 and further characterized by said annular chamber having a cross-section substantially the same as the diameter of the wire.

8. A device for embedding an elongated helically shaped reinforcing element as defined in claim 2 and further characterized by the edges of said shaft threading cooperating with the confronting portion of said fixed sleeve to define a guide for said reinforcing element, said guide being in registration with said passage.

9. A device for embedding a helically shaped reinforcing element as defined in claim 2 and further characterized by a fixed core coaxial with said shaft and extending forwardly therefrom through said sizing run for cooperating with the inner face of the extrusion head portion to define said sizing run, said core being of cylindrical form and having a diametrally reduced portion in the zone of said sizing run for effecting relative increase in the cross section of the latter with respect to the cross section of said passage.

10. A device for embedding a helically shaped reinforcing element within a molded thermoplastic body as defined in claim 6 and further characterized by said shaft extending forwardly within the extrusion head portion concentrically with said sizing run and defining one side thereof, said shaft extension being relatively diametrally reduced in its portion within said sizing run.

11. A device for embedding a helically shaped reinforcing element within a molded thermoplastic body as defined in claim 2 and further characterized by a bushing registering with said fixed sleeve at its forward end and in encircling relationship to the forward portion of said shaft, said bushing being axially slideably mounted within said extrusion head rear portion and having like inside diameter as said sleeve, means rotating said shaft within both said sleeve and said bushing.

* * * * *